United States Patent
Radjenovic et al.

(10) Patent No.: US 12,434,984 B2
(45) Date of Patent: Oct. 7, 2025

(54) METHOD TO PREPARE GRAPHENE COATED SPONGES, SPONGES OBTAINED THEREOF, ELECTRODES OBTAINED FROM SUCH SPONGES AND USES OF THE SPONGES FOR WATER TREATMENT

(71) Applicants: Institució Catalana de Recerca i Estudis Avançats, Barcelona (ES); Fundació Institut Català de Recerca de l'Aigua, Girona (ES)

(72) Inventors: Jelena Radjenovic, Girona (ES); Luis Miguel Baptista Pires, Girona (ES); Giannis-Florjan Norra, Girona (ES); Nick Duinslaeger, Girona (ES)

( * ) Notice: Subject to any disclaimer, the term of this patent is extended or adjusted under 35 U.S.C. 154(b) by 374 days.

(21) Appl. No.: 18/029,399

(22) PCT Filed: Sep. 30, 2021

(86) PCT No.: PCT/EP2021/076930
§ 371 (c)(1),
(2) Date: Mar. 30, 2023

(87) PCT Pub. No.: WO2022/069621
PCT Pub. Date: Apr. 7, 2022

(65) Prior Publication Data
US 2023/0357057 A1  Nov. 9, 2023

(30) Foreign Application Priority Data
Oct. 2, 2020 (EP) .................................. 20382879

(51) Int. Cl.
*C02F 1/461* (2023.01)

(52) U.S. Cl.
CPC ..................... *C02F 1/46109* (2013.01); *C02F 2001/46138* (2013.01); *C02F 2001/46161* (2013.01)

(58) Field of Classification Search
CPC ........ C02F 1/46109; C02F 2001/46138; C02F 2001/46161
See application file for complete search history.

(56) References Cited

FOREIGN PATENT DOCUMENTS

CN    107413161 A  * 12/2017  ............. B01D 53/02

OTHER PUBLICATIONS

Ali, I., et al., "Graphene based adsorbents for remediation of noxious pollutants from wastewater", Environment International, 127, pp. 160-180. (Year: 2019).*

(Continued)

*Primary Examiner* — Benjamin L Lebron
(74) *Attorney, Agent, or Firm* — Eugenio J. Torres-Oyola; Victor M. Rodriguez-Reyes; Rafael Rodriguez-Muriel

(57) ABSTRACT

The present invention is directed to a method to prepare a graphene coated sponge comprising: filling mineral wool with a solution comprising graphene material by successive squeezing to obtain a mineral wool soaked with graphene material; transferring the mineral wool soaked with graphene material into a hydrothermal reactor and submitting it to heating from 60 to 240° C. for 5 minutes to 72 hours to have graphene material bonded to mineral wool and cleaning the heated material to remove the unbonded graphene material and reaction by-products from the graphene coated mineral wool. The present invention also relates to a graphene coated sponge obtained by the mentioned method and the use of such graphene sponge as water-treating agent.

12 Claims, 5 Drawing Sheets

(56) References Cited

OTHER PUBLICATIONS

Cataldi, P., et al., "Keratin-graphene nanocomposite: transformation of waste wool in electronic devices", ACS Sustainable Chem. Eng., 7, pp. 12544-12551. (Year: 2019).*
Molina, J., et al., "Chemical and electrochemical study of fabrics coated with reduced graphene oxide", Applied Surface Science, 279, pp. 46-54. (Year: 2013).*
Schoonraad, G., et al., "Synthesis and optimization of a novel graphene wool material by atmospheric pressure chemical vapor deposition", J Mater Sci, 55, pp. 545-564. Available online Aug. 27, 2019. (Year: 2020).*
Fugetsu, B., et al., "Graphene oxide as dyestuffs for the creation of electrically conductive fabrics", Carbon, 48, pp. 3340-3345. (Year: 2010).*
Ge, J., et al., "Joule-heated graphene-wrapped sponge enables fast clean-up of viscous crude-oil spill", Nature Nanotechnology Letters, Supplementary Information. (Year: 2017).*
Ge, J. et al., "Joule-heated graphene-wrapped sponge enables fast clean-up of viscous crude-oil spill", Nature Nanotechnology, 12, p. 434-440 (2017).
Zhang Y. F. et al., "Adsorption of Dye in Media Industry Pollution with Glass Wool Modified by Graphite Oxide", Applied Mechanics and Materials, vol. 448-453, pp. 119-122 (2013).

* cited by examiner

METHOD TO PREPARE GRAPHENE COATED SPONGES, SPONGES OBTAINED THEREOF, ELECTRODES OBTAINED FROM SUCH SPONGES AND USES OF THE SPONGES FOR WATER TREATMENT

TECHNICAL FIELD

The present disclosure relates to a method to prepare a graphene coated sponge and to a graphene coated sponge obtained by said method. It further relates to an electrode obtained from said sponge, an electrochemical cell comprising such an electrode and to the use of the graphene coated sponge and the electrode as water-treating agents.

BACKGROUND ART

Recently, three-dimensional (3D) graphene-based macrostructures have been developed as electrodes for supercapacitors, batteries, and sensors due to their high specific area, exceptional mechanical properties, and versatile surface chemistry. One of the greatest advantages of graphene-based materials is the possibility to fine-tune their electrical (e.g., conductivity, electrocatalytic activity), physico-chemical (e.g., hydrophobicity, surface roughness) and mechanical properties (e.g., porosity, flexibility) by setting the degree of graphene oxide (GO) reduction and introducing defects and dopants into the graphene network. There exists a plethora of 3D graphene macrostructure production methodologies but stands out the use of mineral wool (MW), a porous template with high temperature stability (up to 1000° C.), which enables easy synthesis of graphene sponges at elevated temperatures and pressures. MW has good dimensional stability, maintaining the open pore structure after the synthesis, and is compressible, thus enabling easy application in various reactor geometries. Industrial activities produce large amounts of waste MW that is largely dumped. Reusing this waste MW not only enables low cost synthesis of graphene coated sponges but is also a step towards circular economy. 3D graphene macrostructures and membranes have been used in several applications.

GE, J. et al. "Joule-heated graphene-wrapped sponge enables fast clean-up of viscous crude-oil spill" Nature Nanotechnology, 12, pages 434-440 (2017) discloses the use of a Joule-heated graphene-wrapped sponge to clean-up viscous crude oil at high sorption speed, thereby reducing in situ the viscosity of the crude oil, which prominently increased the oil-diffusion coefficient in the pores of the sponge and thus speeding up the oil-sorption rate.

US 2013/0230709 A1 discloses a method for preparing a porous graphene material comprising the following steps: mixing graphene or graphene oxide with pore-forming agent, and pressing to obtain bulk or powder particle composite; heating the composite and releasing gases form the pore-forming agent. Such porous graphene material can be used as electrode materials of supercapacitor and lithium ion battery.

US 2016/0257569 A1 discloses a method that includes contacting at least one elemental metal with a composition having graphene oxide under conditions sufficient to reduce at least a portion of the graphene oxide to graphene.

U.S. Pat. No. 9,499,410 B2 discloses a method of making a metal oxide-graphene composite that can include, for instance, providing a composition including graphene oxide and at last one elemental metal dispersed in a liquid medium, and heating the composition in a sealed chamber at a temperature above a nominal boiling point of the liquid medium to from the metal oxide-graphene composite.

Electrochemical systems are a very good candidate to become platform technology for decentralized water and wastewater treatment as they do not chemical reagents, do not form a residual waste stream, operate at ambient temperature and pressure, are robust, versatile and have a small footprint. They offer the most direct approach to translate the energy input into contaminant degradation by a simple application of an electric potential/current, which leads to oxidation/reduction of organic contaminants directly through charge transfer at the electrode surface, and indirectly via electrochemically generated oxidant species. However, evolution of electrochemical treatment from laboratory-scale to real-world application faces two major bottlenecks: 1) high energy consumption and thus high operational cost of the treatment using conventional flow-by, two dimensional (2D) systems due to the pronounced mass transfer limitations for low ng-μg/L concentrations of contaminants in water, and 2) formation of toxic halogenated organic and inorganic byproducts in the presence of halide ions, which occurs to varying degrees to all electrode materials reported to date.

One of the main drawbacks of all currently available anode materials is rapid oxidation of chloride to chlorine ($Cl_2$), which dissolves to a long-lived oxidant, hypochlorous acid/hypochlorite (HOCl, $OCl^-$), and reacts with organic matter to form toxic and persistent chlorinated byproducts. In the case of highly oxidizing anodes (e.g., boron-doped diamond (BDD), $Ti_4O_7$), chloride can be further oxidized to form toxic chlorate ($ClO_3^-$) and perchlorate ($ClO_4^-$). Given that chloride is present in virtually all contaminated water, formation of chlorinated byproducts represents a major challenge for safe application of electrochemical water treatment systems.

In addition, electrochemical oxidation can remove per- and polyfluoroalkyl substances (PFASs) from water. Yet, the energy consumption for complete removal of PFASs is unacceptably high (>30 kWh/m3), and more importantly, the electrodes capable of their removal, boron doped diamond (BDD) anodes have excessive cost (~6,000€/m2). PFASs are resistant towards most oxidants and reductants applied in advanced water and wastewater treatment due to the strength of C—F bonds and the high electronegativity of fluorine. PFAS have a demonstrated specific toxicity to the immune system and may cause cancer, liver damage, and hormone disruption.

SUMMARY OF THE INVENTION

In order to address one or more of the foregoing problems, one aspect of the present invention provides a method to prepare a graphene coated sponge comprising filling mineral wool with a solution comprising graphene material by successive squeezing to obtain a mineral wool soaked with graphene material; transferring the mineral wool soaked with graphene material into a hydrothermal reactor and submitting it to heating from 60 to 240° C. for 5 minutes to 72 hours to have graphene material bonded to mineral wool; and cleaning the heated material to remove the unbonded graphene material and reaction by-products from the graphene coated mineral wool.

Another aspect of the invention relates to a graphene coated sponge obtained by the method described herein.

A further aspect of the present invention relates to an electrode obtained by connecting to electrical current the graphene coated sponge described herein.

The present invention also relates to an electrochemical flow-through reactor comprising the graphene coated sponge electrodes as described herein.

Furthermore, the present invention describes a method of treating water comprising passing the water through the electrochemical flow-through reactor described herein.

The present invention also relates to the use of the graphene coated sponge as described herein as a water-treating agent, and to the use of the electrode as described herein as a water treating-agent.

BRIEF DESCRIPTION OF THE DRAWINGS

FIG. 3 also depicts the X-ray photoelectron spectroscopy (XPS) spectra of GO, BRGO and NRGO of c) carbon, d) oxygen, e) nitrogen and f) boron. FIG. 3 g) depicts the Raman spectroscopy profiles of GO, BRGO and NRGO.

DETAILED DESCRIPTION OF THE INVENTION

Figure 1:
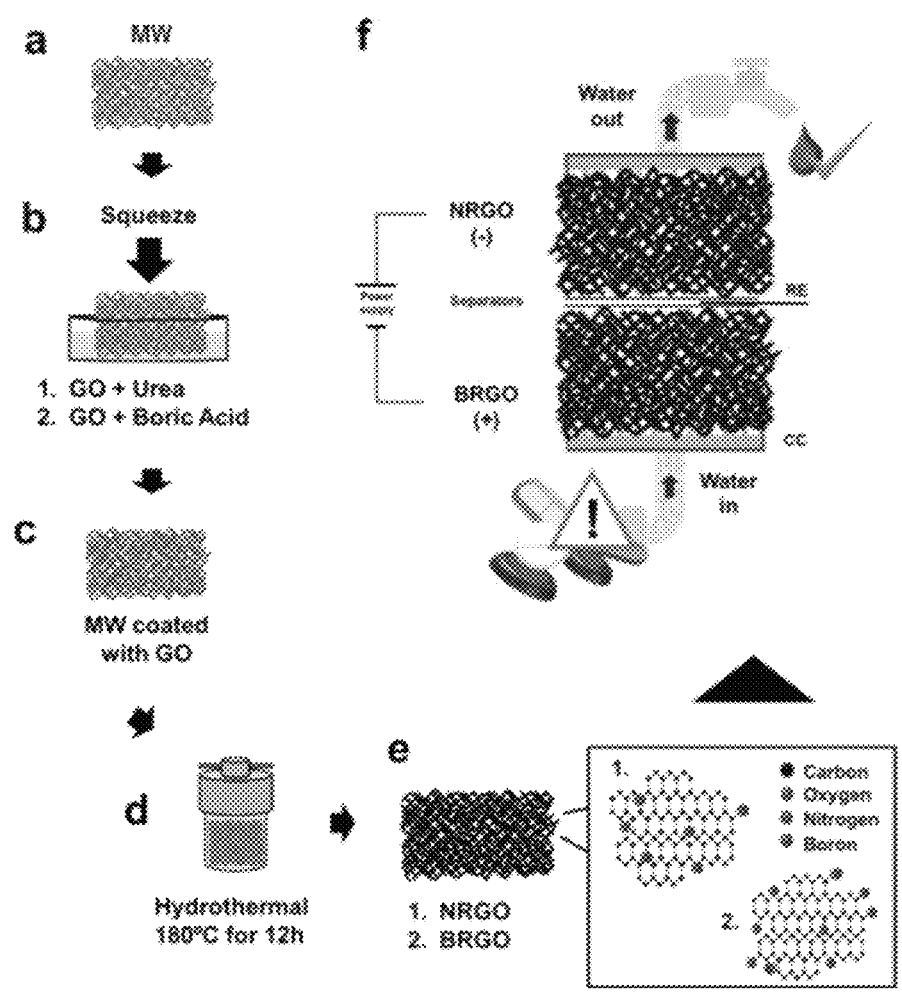
FIG. 1 a-e depicts a graphical representation of the methodology for the production of graphene coated sponge based on a hydrothermal reaction of graphene oxide (GO) dispersion and FIG. 1 f depicts a graphical representation of an electrochemical flow-through water treatment system.

Unless otherwise indicated, all percentages relating to the content of a component or to a collection of components of the composition of the present invention refer to the weight percentage with respect to the total volume of the composition.

As described hereinabove, the present invention relates to a method to prepare a graphene coated sponge comprising filling mineral wool with a solution comprising graphene material by successive squeezing to obtain a mineral wool soaked with graphene material; transferring the mineral wool soaked with graphene material into a hydrothermal reactor and submitting it to heating from 60 to 240° C. for 5 minutes to 72 hours to have graphene material bonded to mineral wool; and cleaning the heated material to remove the unbonded graphene material and reaction by-products from the graphene coated mineral wool.

In the present invention, the graphene material is typically selected from the group consisting of graphene, graphene oxide, reduced graphene oxide, pristine graphene, polycrystalline graphene, and graphene quantum dots.

A further aspect of the invention relates to a method to prepare a graphene coated sponge wherein the graphene material is graphene oxide.

A hydrothermal reactor according to the present invention may be an autoclave.

Optionally, the method to prepare a graphene coated sponge may include a further freeze-drying step of the graphene coated sponge after the cleaning step.

The cleaning step in the method according to the present invention may be carried out in a water-based bath or in a flow-through reactor.

The heated material resulting from the transferring and heating step according to the present invention might be cleaned in a water-based bath for a time between 1 minute and 72 hours at a temperature from 30 to 200° C.

Preferably, the time may be from 10 minutes to 48 hours, more preferably from 1 hour to 24 hours, even more preferably from 6 hours to 18 hours.

Preferably, the temperature of the water-based bath may be from 40 to 200° C., more preferably from 60 to 200° C., more preferably from 100 to 200° C., even more preferably from 150 to 200° C.

The method according to the present invention may further comprise a solution comprising the graphene material method including a dopant.

Dopants, or doping agents, are traces of impurity elements introduced into a chemical material to alter its original electrical or optical properties. The amount of dopant necessary to cause changes is typically very low. Dopants introduce defects in the structure of the chemical material favoring ion diffusion.

In the present invention, dopants are preferably selected from the group consisting of boric acid, urea, metal precursors and 2D materials.

The metal precursors according to the present invention are, preferably, metallic chlorides, and more preferably, selected from the group consisting of tin chloride (II) ($SnCl_2$), iron chloride (II) ($FeCl_2$), titanium chloride (IV) ($TiCl_4$) and mixtures thereof.

The 2D materials according to the present invention are preferably selected from hexagonal boron nitride, phosphorene, molybdenum disulfide ($MoS_2$) and mixtures thereof.

Doping the graphene with nitrogen-containing compounds (such as urea) might be applied to enhance the production of hydrogen peroxide ($H_2O_2$) at the cathode and activation of hydroxyl radicals (OH·).

In addition, doping of carbon-based materials with boron enhances the generation of ozone ($O_3$), and might be employed in the present invention to enhance the electrocatalytic activity of graphene sponge anodes.

The method according to the present invention involves a solution comprising graphene material in a concentration between 0.001 and 10 g/L of graphene material per liquid base, preferably between 0.01 and 10 g/L, preferably between 0.1 and 10 g/L, more preferably between 1 and 8 g/L, more preferably between 2 and 6 g/L, even more preferably between 3 and 5 g/L.

The present invention also describes a graphene coated sponge obtained by the method described herein.

The graphene coated sponge is flexible and easily shaped when wet, and can be produced in different geometries, scrolled, bended and/or compressed.

The present invention further discloses an electrode obtained by connecting to electrical current the graphene coated sponge described herein.

The electrode according to the present invention may further include metallic current feeders configured to connect the graphene coated sponge to electrical current. Preferably, the metallic current feeders are selected from the group comprising stainless steel, titanium and tantalum.

The graphene coated sponge may be connected to either a direct current (DC) or an alternate current (AC) power source and may be employed as electrodes for electrochemical degradation of persistent pollutants.

The present invention also discloses an electrochemical flow-through reactor comprising the graphene coated sponge electrodes described herein including at least an anode and a cathode. At least one of the anode or cathode is an electrode comprising the graphene coated sponge.

Since the graphene coated sponge is flexible, this material is very well suited to be applied in varying reactor geometries. The reactors of the present invention might be of different geometries, for instance planar or circular.

Furthermore, the present invention also discloses a reactor having multiple anodes and multiple cathodes, wherein at least one of the electrodes is made of the graphene coated sponge. Other reactors comprising the graphene coated sponge electrodes are disclosed herein.

The electrochemical reactor may include one graphene coated sponge electrode designed as a simple filter, but other possibilities are envisaged. The electrochemical reactor may be a column-type reactor or a Swiss roll reactor-analogous to a reverse osmosis module.

The present invention further discloses a method of treating water comprising passing the water through the electrochemical flow-trough reactor described herein. Water purification may preferably involve the electrochemical degradation of persistent pollutants in a flow-through, single pass mode electrochemical filter as described herein.

The water treated by the electrochemical reactor according to the present invention might be of low conductivity, such as tap water. Typically, the present invention allows treating water presenting a conductivity of 0.4 mS/cm or more, preferably 0.7 mS/cm or more, preferably 1.2 mS/cm or more.

The conductivity of the electrolyte has a significant impact on the performance of highly porous electrodes, because the ohmic potential drop in electrode pores can result in only a fraction of the total surface are being electroactive for compound oxidation. Most of the groundwater, surface water and even municipal wastewater effluents are low conductivity solutions (i.e. <2 mS/cm). Thus, it is of crucial significance that our present invention can perform well using low conductivity solutions, in particular when working with a porous electrode material such as the disclosed graphene coated sponges.

The present invention further discloses the use of the graphene coated sponge as described herein as a water-treating agent.

Furthermore, the present invention discloses the use of the electrode as described herein as a water-treating agent.

Graphene sponges according to the present invention surprisingly do not produce any chlorate, perchlorate and barely any $Cl_2$ (current efficiency for $Cl_2$ production is only 0.04% in the presence of 20 mM chloride). These results stand in stark contrast with the performance of not only commercial electrode materials, but also novel porous electrodes such as $Ti_4O_7$ and carbon nanotube (CNT)-based electrochemical membranes. It shows that graphene coated sponge electrodes developed in this invention hold great promise for electrochemical water treatment, as one of the major bottlenecks of electrochemical technology—increase in treated effluent toxicity due to the formation of toxic byproducts, is completely avoided.

Efficient removal of model persistent organic contaminants (e.g., iodinated contrast media diatrizoate (DTR) and iopromide (IPM), antibacterial agent triclosan (TCL), anti-inflammatory drug diclofenac (DCF)) and PFOA and PFOS from low conductivity solution (1.2 mS/cm) was obtained, thus demonstrating good performance of the system when working under realistic conditions of water treatment. Partial removal of shorter-chain PFASs was also observed, which can be difficult to be removed even by other electrochemical systems. Given the modularity of the electrochemical filter according to the present invention, complete removal of short-chain PFASs can be achieved by using several graphene sponge electrochemical filters in series. In addition, the synthesis of graphene sponges is low cost, easily scalable and allows easy introduction of dopants (atomic dopants, 2D materials, etc.).

The present application thus shows the elimination of a set of persistent organic contaminants whose main mechanisms of degradation are based on hydroxyl radicals, and the elimination of PFASs that can only be degraded via direct electron transfer. By using the graphene sponges described herein there is no production of chlorine, chlorate and perchlorate. Furthermore, B-doped graphene sponge anode can form ozone in situ. All this was demonstrated under realistic conditions of water treatment (i.e., low initial concentration of target pollutants and low conductivity supporting electrolyte), and the same performance when working with real tap water was also observed.

EXAMPLES

The following examples are provided with the intent of further illustrating the present invention but should in no case be interpreted as to be limiting of the present invention.

Example 1: Synthesis of Graphene Coated Sponges

Graphene coated sponges were prepared using cheap mineral wool (MW) as a template. Three different graphene oxide solutions were prepared: i) 70 mL of 4 g/L GO solution for the production of RGO sponge, ii) 6 g of boric acid dissolved in 70 mL of 4 g/L GO solution for the production of BRGO sponge, iii) 42 g of urea dissolved in 70 mL of 4 g/L GO solution for the production of NRGO sponge. A schematic illustration of the protocol followed to synthesize graphene coated sponges is illustrated in FIG. 1. MW (FIG. 1a) is filled with a GO-based solution (4 g/L) by successive squeezing (FIG. 1b). Then, MW soaked with GO (FIG. 1c) is transferred into a hydrothermal reactor and treated for 180° C. for 12 h. The resulting material (FIG. 1e) was placed in a water bath for two days to remove the un-bonded graphene sheets and added reagents (the remaining impurities).

Figure 2:
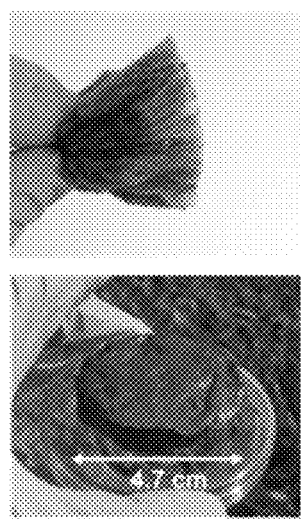
FIG. 2 shows images of mineral wool (MW) and a graphene coated sponge.

This synthesis method enabled to introduce dopants into the graphene macrostructure such as boron and nitrogen by a simple addition of boric acid (for BRGO) and urea (for NRGO) respectively, to the initial GO solution (FIGS. 1b and 1e). BRGO and NGO sponges were employed as electrodes for electrochemical degradation of persistent pollutants in electrochemical reactor in flow-through, single pass mode, as represented in FIG. 1f. From FIG. 2 it can be observed how the hydrothermal reaction and coating of MW with graphene cause shrinking and compression of the MW template.

Example 2: Graphene Sponge Characterization

Figure 3:
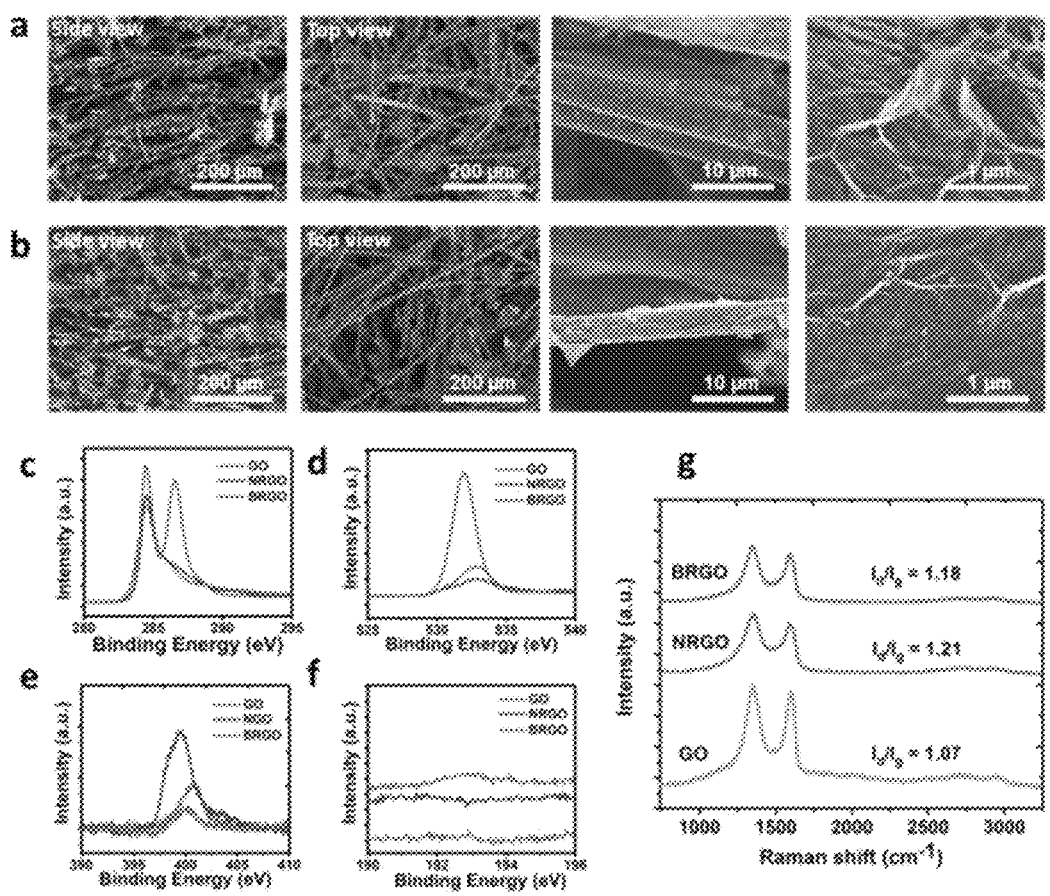
FIG. 3 depicts the scanning electron microscope images of a) boron-doped graphene oxide (BRGO) sponge and b) nitrogen-doped reduced graphene oxide (NRGO) sponge.

Graphene coated sponges were characterized by scanning electron microscopy (SEM), performed on a FEI Quanta FEG (pressure: 70 Pa; HV: 20 kV; sport: four). SEM analyses of the synthesized graphene coated sponges confirmed the presence of graphene coating and formation of a 3D porous structure supported by MW yarn skeleton (FIG. 3 a, b). From the side view SEM image, horizontally aligned stacked graphene walls can be observed, which is consistent with the initial macrostructure of MW (FIG. 1g).

The graphene sponge was also characterized by Raman, using a dispersive spectrometer Jobin-Yvon LabRam HR 800, coupled to an optical microscope Olympus BXFM. The CCD detector was cooled at $-70^{OCV}$ and a 532 nm laser line was used with a dispersive grating of 600 lines/mm and a laser power at sample of 0.5 mW. The level of defects was measured using Raman spectroscopy (FIG. 3g) and was calculated by measuring the intensity ratio of D peak at 1347 $cm^{-1}$ ($I_d$) and a G peak at 1581 $cm^{-1}$ ($I_g$). A ratio of zero means no defects at all, and a higher ratio means higher defect content in the graphene coated sponge resulting from the reduction procedure. An $I_d/I_g$ ratio of 1.04 for GO, 1.18 for BRGO and 1.21 for NRGO was determined. Higher $I_d/I_g$ ratio for BRGO and NRGO sponge is a result of the reduction of GO and indicates a defect-rich structure, which facilitates the contact between the electrode and the electrolyte, acting as an electrocatalytic active site and favouring ion diffusion.

X-ray diffraction (XRD) data was acquired with an X'pert multipurpose diffractometer at room temperature using a CuKα radiation (I=1.540 Å). This has a vertical θ-θ goniometer (240 mm radius), where the sample stages are fixed and do not rotate around the Ω axis in Ω-2θ diffractometers. The detector used is an X-Celerator, that is, an ultrafast X-ray detector based on real time multiple strip technology. The diffraction pattern was recorded between 4° and 30° using a step size of 0.03° and a time per step of 1,000 s.

XRD analysis showed a decrease in the interlayer spacing from 8.1 A for GO to −3.5 A for BRGO and NRGO as a consequence of the removal of oxygen functional groups from the basal plane. The XRD analysis also confirmed the absence of any trace metals in the initial MW and produced graphene coated sponges, thus excluding any possible interference in the (electro)catalysis.

X-ray photoelectron spectroscopy (XPS) measurements were done with a Phoibos 150 analyzer (SPECS GmbH, Berlin, Germany) in ultra-high vacuum conditions (base pressure 1-10 mbar) with a monochromatic aluminum Kα x-ray source (1486.74 eV). The energy resolution as measured by the full width at half-maximum intensity (FWHM) of the Ag 3d5/2 peak for a sputtered silver foil was 0.58 eV. According to XPS (FIG. 2c-f), the initial GO material has a C/O atomic ratio of 1.70, while for BRGO and NRGO a respectively C/O atomic ratio of 3.46 and 4.80 was measured probing the efficiency of reduction, as shown in the following table (Table 1):

TABLE 1

XPS atomic content of GO precursor solution and synthesized graphene sponges NRGO has a successful incorporation of 6.4% of atomic nitrogen (FIG. 3e), while for BRGO the measured content of atomic boron was 1.3% (FIG. 3f).

|       | GO   | RGO  | NRGO | BRGO |
|-------|------|------|------|------|
| C (%) | 62.6 | 70.3 | 77.3 | 75.6 |
| O (%) | 36.9 | 28   | 16.1 | 21.8 |
| N (%) | 0.9  | 1.7  | 6.4  | 1.2  |
| B (%) | 0    | 0    | 0    | 1.3  |

Apart from NRGO, all synthesized graphene-based materials contained around 1% of nitrogen atom originated from impurities in the commercial GO solution employed and not as a result of the reduction methodology. Thus, BRGO can also be considered a co-doped graphene sponge, with B and N atomic functionalization in its structure, although the term BRGO is maintained for simplicity.

The Brunauer-Emmett-Teller (BET) specific surface area and pore size distribution were determined by N2 adsorption-desorption at 77 K (ASAP 2420, Micromeritics). BET surface areas determined were 0.81 $m^2/g$ for MW, 1.39 $m^2/g$ for BRGO and 1.44 $m^2/g$ for NRGO. BET surface area of MW template is similar to previously reported values for glass and rock wool, that are typically below 1 $m^2/g$. Increase in specific surface are in graphene coated sponges relative to MW template can be assigned to the wrinkled structure of graphene nanosheets.

Figure 4:
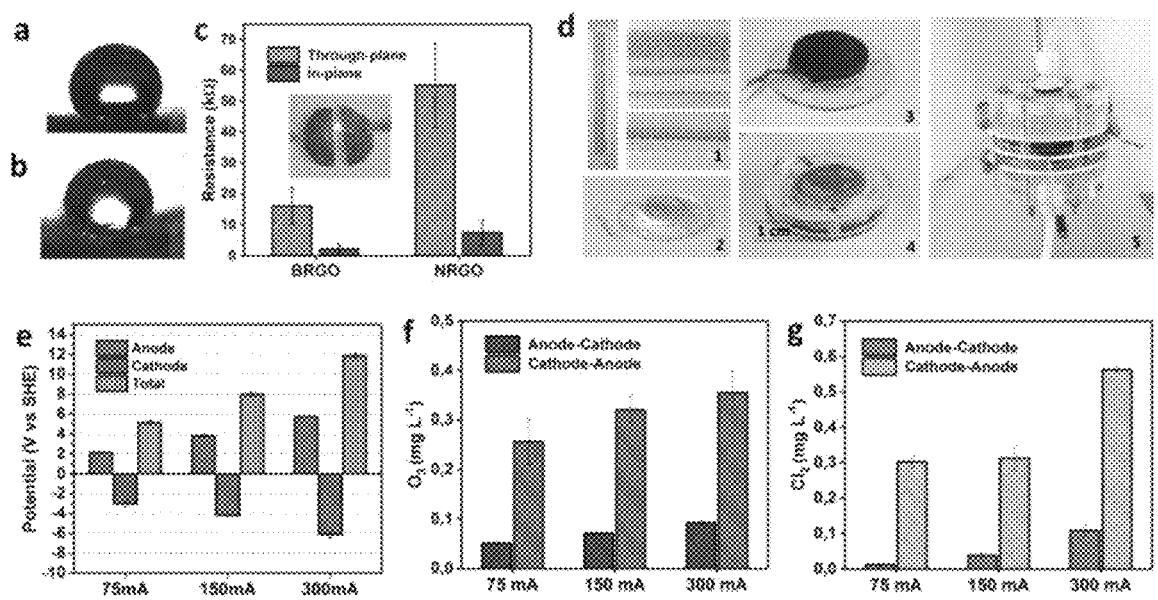
FIG. 4 depicts the contact angle measurement of a) BRGO and b) NRGO, c) through-plane and in-plane resistance of BRGO and NRGO sponges (inset: lightning a LED using graphene sponge as a connector), d) methodology for building the flow-through electrochemical filter, e) anode, cathode and total cell potential at different applied currents for BRGO-NRGO electrochemical filter, generation of oxidant species in BRGO-NRGO electrochemical filter at different applied currents and flow directions f) $O_3$ and g) $Cl_2$ formed in the presence of 20 mM NaCl.

The interaction of a water droplet with the BRGO and NRGO sponges is represented in FIG. 4 a) and b), respectively. The contact angle determined for BRGO was 139.67°±4.50°, and for NRGO it was 137.67°±7.50°, demonstrating the high degree of hydrophobicity of the graphene coated sponges. These experiments were performed in 3 different layers (1× outer and 2× inner surfaces) of the different graphene sponges ensuring the consistency of this behavior.

The cross-plane resistances of the graphene coated sponges were determined in a 0.5×0.5×0.5 cm cube—x, y, z directions—between two geometric opposite faces (FIG. 4c). Through-plane resistances for BRGO and NRGO were measured to be 16.05±5.82 kΩ and 55.33±13.65 kΩ, whereas the in-plane resistances were of 2.26±1.48 kΩ and 7.48±4.01 kΩ, respectively. Higher through-plane than in-plane resistance is a consequence of the fiber direction in the structure of MW, with less fibers connecting the parallel sheets of MW and thus less graphene deposited between these sheets (FIG. 1g). The conductivity of the graphene coated sponges I illustrated by lighting a LED lamp (inset FIG. 4c).

Example 3: Electrochemical Performance of Graphene Coated Sponge Electrodes

Graphene coated sponges were fed with current using a 3D stainless steel current collector with spiral geometric design (FIG. 4d) to ensure a homogeneous distribution of current over x-y axis of the sponge and avoid its compression. Graphene coated sponges with inserted current collector were placed in a 3D electrochemical flow-through cylindrical reactor, made of methacrylate. The reactor equipped with the BRGO anode and NRGO cathode was operated in flow-through, one pass mode, using a 10 mM phosphate buffer (pH 7.2, 1.2 mS/cm).

Electrochemical system was operated at 75 mA, 150 mA and 300 mA of applied anodic current (i.e., current densities calculated using the projected anode surface area of 43.25, 86.50 and 173 A/m$^2$, respectively) during at least 8 h per each current. There was no visual or electrical degradation of any of the graphene sponges, and the recorded anodic potentials were 2.1±0.06, 3.8±0.1 and 5.7±0.02 V/SHE (vs Standard Hydrogen Electrode) for 75, 150 and 300 mA, respectively for three repetitions (FIG. 4e). The pH remained constant at pH 7 in all experiments—the anodic production of H+ was likely compensated by the cathodic production of OH$^-$, eliminating the need for pH correction of the treated water.

To investigate the production of oxidant species typically observed in electrochemical systems, measurements of hydrogen peroxide ($H_2O_2$), ozone ($O_3$) and, in the presence of 20 mM NaCl, chlorine ($Cl_2$), were performed. The placement of the electrodes has a determining impact on the electrogeneration of oxidants. For example, $O_3$ and $Cl_2$ generated at the anode can be easily reduced at the subsequent cathode in the anode-cathode flow direction. Electrogeneration of peroxide may be enhanced in the anode-cathode configuration due to the reduction of anodically generated $O_2$ at the cathode, although the accumulation of bubbles may hinder the effective $O_2$ mass transfer. Thus, we investigated the formation of the above-mentioned oxidants in anode-cathode and cathode-anode reactor configurations at different applied currents. As shown in FIG. 4f, when applying 75 mA in the anode-cathode direction the measured concentration of $O_3$ was 0.05±0.002 mg/L, whereas when the placement of electrodes was reversed, $O_3$ concentration was 0.3±0.05 mg/L (current efficiency 0.13%). Further increase in the applied current enhanced the generation of O3, and at 300 mA the concentrations of O3 measured were 0.09±0.003 mg/L in the anode-cathode configuration, and 0.4±0.04 mg/L for the cathode-anode direction. These results confirmed: i) electrogeneration of $O_3$ at the BRGO anode, proportional to the applied anodic current, and ii) reduction of the formed $O_3$ at subsequent cathode in the anode-cathode flow direction.

The highest reported concentration of O3 formed was 3.5 mg/L at current density of 700 A/m$^2$ in saturated solution of $K_2SO_4$ (~726 mM), thus a highly conductive supporting electrolyte (>85 mS/cm). To investigate the impact of solution conductivity on O3 formation, experiments using 100 mM $KH_2PO_4/K_2HPO_4$ buffer (11 mS/cm) as supporting electrolyte were performed. The concentration of the formed $O_3$ in cathode-anode configuration was two-fold higher compared to low-conductivity solution, i.e., 0.7 mg/L at 300 mA of applied current. Thus, the developed graphene coated sponges used with highly conductive supporting electrolytes may find potential application for in situ electrochemical ozone production.

The measurement of the electrogenerated $H_2O_2$ was also performed using potassium titanium (IV) oxalate spectrophotometric method. Yet, no $H_2O_2$ was detected in neither anode-cathode nor cathode-anode configurations. Enhancement in cathodic production of $H_2O_2$ by the addition of graphene coating is widely reported in literature and is mainly attributed to the carbon atoms adjacent to oxygen functional groups (—COOH and C—O—C) and the ring defects along the graphene nanosheet edges being the active sites for the oxygen reduction reaction via two-electron pathway.

No detection of $H_2O_2$ may be a consequence of its rapid decomposition to short-lived hydroxyl radicals (OH·). Previous studies reported that N-doping in the graphitic structure induces both production of $H_2O_2$ and its activation to OH. Thus, it is likely that the same occurred in the present invention. The formed OH rapidly reacted with the trace organic contaminants, thus contributing to their degradation.

To determine the production of chlorine in the present invention, experiments were performed with 20 mM NaCl added to 10 mM $KH_2PO_4/K_2HPO_4$ buffer, and applied currents of 75, 150 and 300 mA. Such high concentration of Cl$^-$ was intentionally selected to build up $Cl_2$, and is equivalent to the salinity of reverse osmosis (RO) brines from water reclamation plants. In spite of such high Cl$^-$ concentration, the highest concentration of free chlorine measured in the cathode-anode direction was only 0.56±0.007 mg/L (FIG. 4g), whereas in the anode-cathode configuration it was somewhat lower, 0.1±0.02 mg/L, due to the cathodic reduction of the formed $Cl_2$. The calculated current efficiency for $Cl_2$ formation in cathode-anode direction was only 0.04%. Moreover, neither $ClO_3^-$ nor $ClO_4^-$ formation was detected in any of the conducted experiments, further demonstrating that there was very little electrochemical oxidation of chloride ions present in the system.

Example 4: Electrochemical Removal of Persistent Organic Compounds

Following the electrocatalytic impact of the electrode order placement in the flow-through reactor, electrochemical removals of model trace organic contaminants were evaluated in anode-cathode (FIG. 5a) and cathode-anode (FIG. 5b) flow directions.

All experiments were conducted in one-pass continuous mode, with a flow rate set at 5 mL/min that corresponds to a surface area-normalized permeate flux of 175 L/m$^2$ h (LMH), unless otherwise specified. The flow rate was controlled using a digital gear pump (Cole-Farmer). Graphene coated sponges were wired by a stainless-steel current collector to ensure a good distribution of current. Open circuit (OC) experiments were conducted to verify the loss of target contaminants due to their adsorption onto the graphene coated sponge electrodes. Electrochemical degradation experiments were conducted in the chronopotentiometric mode using a BioLogic multi-channel potentiostat/galvanostat VMP-300 and a leak-free Ag/AgCl reference electrode (Harvard Apparatus). The applied anodic currents were 75, 150 and 300 mA. Model persistent organic pollutants were added to 10 mM phosphate buffer ($Na_2HPO_4$/$NaH_2PO_4$) at pH 7.2, with a conductivity of 1.2 mS/cm. Before each experiment, the reactor was firstly flushed with milliQ water and 10 mM phosphate buffer. To investigate the impact of chloride, experiments were performed using the same buffer (phosphate) and with the addition of 20 mM NaCl. The experiments were performed in anode-cathode and cathode-anode sequence, to investigate the impact of electrode order on the system performance. The permeate flux (J, L/m$^2$ h, LMH) was calculated by dividing the volumetric flow rate over the projected surface area of the electrodes (17.34 cm$^2$). The removal of persistent organic contaminants was expressed using electrooxidation flux ($J_{ELOX}$, mol/m$^2$ h), calculated according to the following:

$$J_{ELOX} = (C - C_0) \times J$$

Where C an $C_0$ are feed and permeate concentrations of a given contaminant (μM), respectively.

The electric energy consumption ($E_c$, kWh/m³) was calculated according to the following equation:

$$E_c = \frac{U \cdot I}{q \cdot \log \frac{C}{C_0}}$$

Where q is the flow rate (L/h), U the average cell voltage (V) and/the applied current (A). Note that $\log(C/C_0)=1$ for one order of magnitude removal, and $\log(C/C_0)<1$ for removals lower than 90%.

The behavior of organic pollutants in the OC experiments was similar in the two configurations investigated, with effluent concentrations of TCL and DCF decreased for ~80% and 20%, respectively, due to their adsorption onto the graphene coated sponges, whereas for IPM and DTR no adsorption was observed. Almost complete removal of TCL by adsorption can be explained by its high hydrophobicity (log D=5.13) and relatively low polar surface area (PSA) of 29 Å². Apart from TCL, 10-20% removal observed for DCF in the OC experiments indicates its partial adsorption to the graphene sponges. Although the reported log $K_{OW}$ of DCF is 4.1, at experimental pH 7-7.2 this compound will be present in its ionized form and thus its hydrophobicity is significantly decreased. Thus, negatively charged DCF and with somewhat higher molecular PSA (49 A2) will have a lower tendency for hydrophobic and π interactions. IPM and DTR, being very hydrophilic compounds and with PSAs of 169 Å² and 96 Å², respectively, are not expected to be adsorbed onto the graphene sponges, which was evidenced by their effluent concentrations in the OC experiments equal to their feed concentrations (FIG. 5a).

Figure 5:
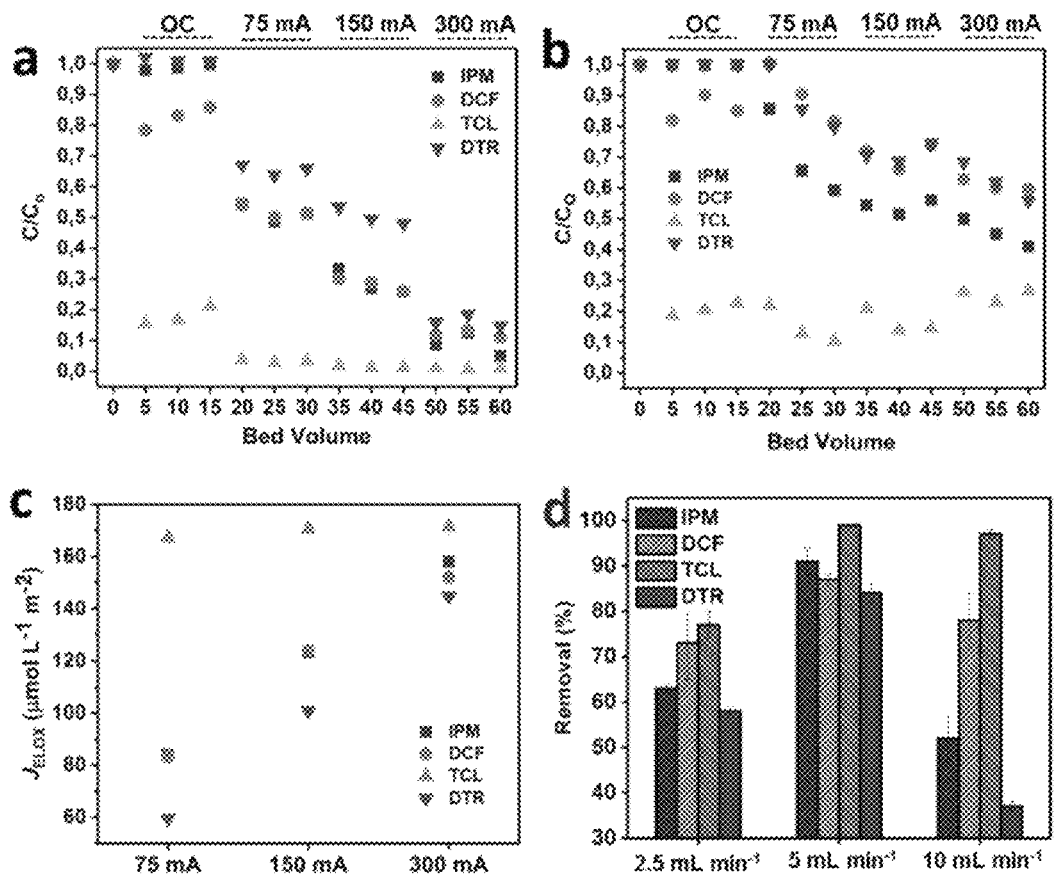
FIG. 5 illustrates the electrochemical removal of persistent organic contaminants using graphene coated sponge electrodes in anode-cathode flow direction: feed concentrations (C) of target contaminants normalized to permeate concentrations ($C_0$) in the open circuit (OC) and at different anodic currents and constant flow rate of 5 mL/min in a) anode-cathode and b) cathode-anode directions; c) electrooxidation fluxes (JELOX) of target contaminants obtained at different anodic currents and constant flow rate of 5 mL/min, d) removal (%) vs flow rate at 300 mA of applied current.

When current was applied, the performance of anode-cathode configuration was clearly superior, with higher removal rates observed for all target contaminants (FIG. 5a, b). At the highest applied current of 300 mA, in anode-cathode configuration the obtained removal efficiencies of IPM, DCF, TCL, and DTR were 91±3%, 88±1%, 99±0.01%, and 84±2% (FIG. 5a) whereas for the cathode-anode configuration the removal efficiencies were 54.6±4%, 39.2±2%, 74.6±2%, and 37.9±6% (FIG. 5b), respectively. At the same applied current, the better performance of BRGO anode and NRGO cathode in anode-cathode flow direction can be explained by several factors: i) anode-cathode configuration is characterized by an enhanced production of $H_2O_2$ via cathodic reduction of $O_2$ produced at the upstream anode; and ii) enhanced activation of $O_3$ generated at the anode by $H_2O_2$ produced at the cathode. In addition, higher accumulation of bubbles was observed in cathode-anode flow direction and likely impacted the wetting of the upstream BRGO anode and decreased the interaction of trace contaminants with the anode surface.

In anode-cathode configuration, the removal of TCL (i.e., 99%) was somewhat improved relative to OC experiment (i.e., 82%). Pronounced adsorption of TCL onto the graphene sponge electrodes made it difficult to distinguish the contribution of electro degradation to its removal. Nevertheless, TCL likely reacted with the electrogenerated $O_3$ and OH given its reported bimolecular rate constants with these oxidants. In the case of IPM, DTR, and DCF, increase in current from 75 to 150 and 300 mA resulted in a stepwise increase in their removal efficiencies (FIG. 5a). Moreover, applied anodic current was linearly correlated with the calculated electrooxidation fluxes of DTR, IPM and DCF (FIG. 5c). For example, the removal of DTR, highly polar and recalcitrant contaminant, was increased from 34±1% at 75 mA to 58±2% at 150 and 84±2% and 300 mA, respectively. Given that this compound is persistent towards $O_3$ and difficult to remove via OH it is likely that direct electrolysis played a significant role in its electrochemical degradation. In addition, DTR is negatively charged at bulk pH 7, therefore it may have been initially electrosorbed to the BRGO anode. IPM also showed no adsorption affinity towards graphene sponges and its removal was observed only after the application of current, reaching 48±2%, 71±4% and 91±3% at 75, 150 and 300 mA, respectively. IPM was present in its uncharged form at pH 7 (pKa=11.4), thus excluding its electrosorption. Given that IPM did not exhibit any adsorption and electrosorption, its disappearance when current is applied demonstrates its exclusive removal via electrocatalytic degradation at the graphene sponge electrodes. Like DTR, this iodinated contrast agent is recalcitrant to $O_3$ but is more reactive with OH and thus was likely removed by a combination of direct electron transfer and oxidation via OH. Similar to IPM and DTR, increase in current was also linearly correlated with the removal of DCF (FIG. 5a, b), which based on its bimolecular rate constants with $O_3$ (6.8×10⁵ M⁻¹ s⁻¹) and OH· (9.3×10⁹ M⁻¹ s⁻¹) was removed via direct electron transfer and/or the electrogenerated OH. In summary, linear increase in the removal efficiencies of contaminants with low adsorption affinity (DCF) or no adsorption affinity at all (IPM, DTR) with increasing current (FIG. 5b) suggests that these contaminants undergo electrocatalytic degradation, and in the case of DCF and DTR, possible electrosorption at the anode. We did not observe any increase in effluent concentrations above the feed concentrations after turning off the current, and thus, even if initially electrosorbed, DCF and DTR were further degraded.

The calculated electrooxidation fluxes of trace contaminants in anode-cathode configuration at 300 mA of applied current were 171.4±0.1, 152.1±0.1, 158.08±0.04 and 144.7±0.02 µmolL⁻¹ m² for TCL, DCF, IPM and DTR, respectively (FIG. 5c). In the case of TCL, the lower slope value for the successive increasing current, is a result of initial adsorption effect. The electric energy per order ($E_{EO}$) for the removal of target contaminants at 300 mA was 5.8±0.3 kWhm⁻³ for TCL, 11.2±0.3 kWhm⁻³ for IPM, 12.9±0.4 kWhm⁻³ for DCF, and 15.1±0.12 kWhm⁻³ for DTR.

Next, anode-cathode configuration was operated at different flow rates and at 300 mA of applied anodic current (FIG. 5d). Increasing the flow rate to 10 mL/min had a detrimental impact on the removal of trace contaminants with low adsorption affinity, with 38±1%, 52±5% and 78±6% removal obtained for DTR, IPM and DCF, respectively, whereas the removal of hydrophobic TCL was not significantly affected. Although decrease in the flow rate to 2.5 mL/min enabled higher residence time (i.e, 6.9 min), it also led to somewhat worsened removal of trace contaminants compared with the experiments at 5 mL/min. This was likely a consequence of poor evacuation of the electrogenerated $H_2$ and $O_2$ bubbles and their accumulation within the graphene sponges, which caused increased ohmic resistance, poor wetting of the electrodes and thus decreased electrode surface area available for interaction with the contaminants.

To demonstrate the beneficial effect of atomic doping of graphene, experiments were also performed with RGO sponge counter-electrodes, i.e., without the presence of B atom and with 1% N content. The removal of IPM, DTR and DCF was significantly worsened in BRGO-RGO and RGO-NRGO systems compared with the BRGO-NRGO set-up.

Removal of TCL in the OC was somewhat higher when substituting BRGO and NRGO electrodes with RGO sponge, suggesting that atomic doping did not have a significant contribution to the adsorption of the target compounds, which is governed by the π interactions as explained previously. The worsened removal of target pollutants in BRGO-RGO and RGO-NRGO configurations is in line with the expected decreased production and activation of $H_2O_2$ at RGO cathode, and decreased formation of $O_3$ at RGO anode, respectively. Thus, the postulated mechanism of electrochemical degradation of target pollutants is based on the: i) in situ generation of $O_3$ and possibly other reactive oxygen species (e.g., OH·) at the anode, ii) in situ generation of $H_2O_2$ at the cathode and its activation to OH· either using dissolved $O_3$ or NRGO cathode, and iii) direct electron transfer between the target pollutants and graphene sponge electrodes.

Example 5: Electrochemical Removal of Per- and Polyfluoroalkyl Substances

Figure 6:
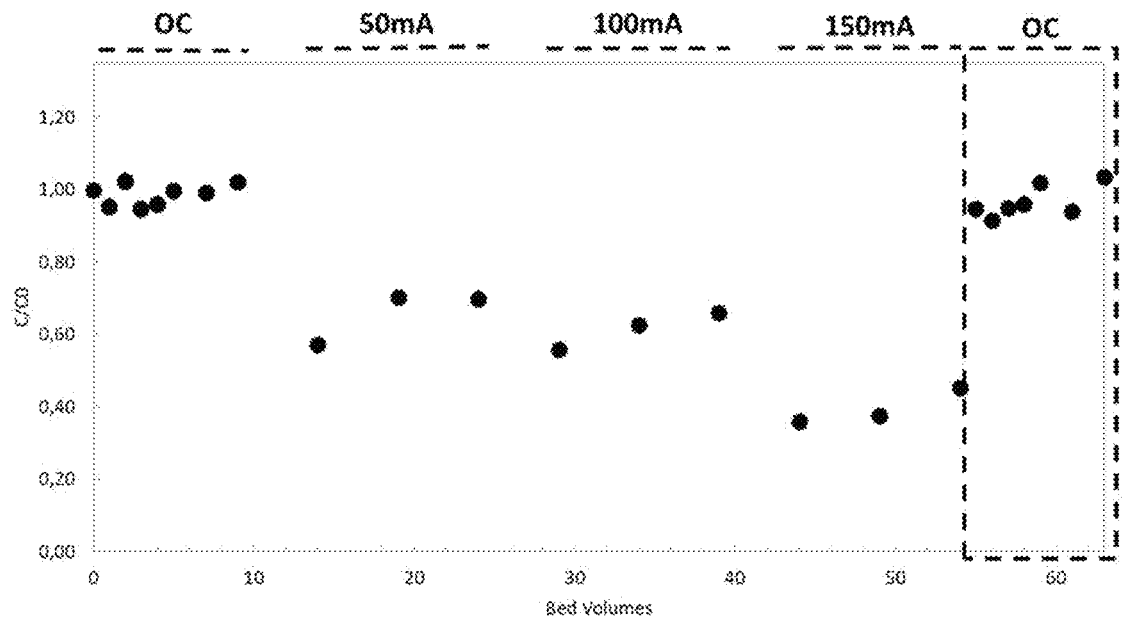
FIG. 6 illustrates the removal of PFOS at 2 µM initial concentration in tap water (conductivity 0.4 mS/cm).
Figure 7:
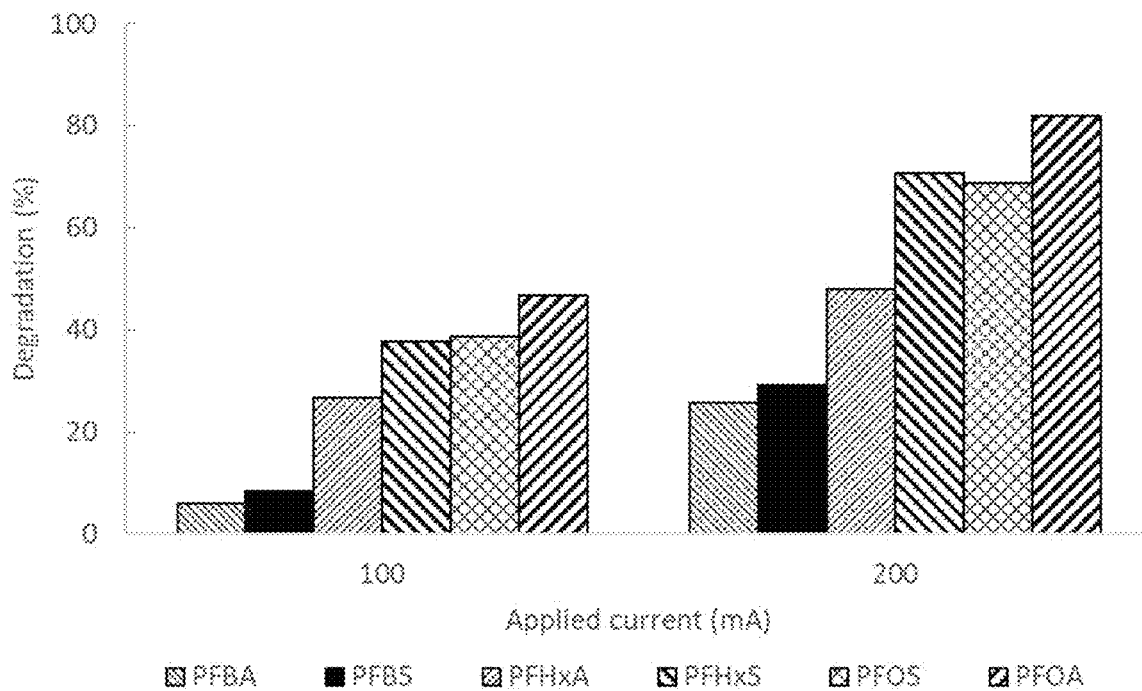
FIG. 7 illustrates the removal of PFOS, PFOA, perfluorohexane sulfonate (PFHxS), perfluorohexanoic acid (PFHxA), perfluorobutane sulfonate (PFBS), perfluorobutanoic acid (PFBA) at 0.2 µM initial concentration in 10 mM buffer (pH 7.2, 1.2 mS/cm).

In the same line as example 4, electrochemical removal of PFASs was evaluated in the flow-through reactor at different current densities for a single model perfluoroalkyl compound, PFOS (FIG. 6), and for a mix of six model perfluoroalkyl compounds, PFBA, PFBS, PFHxA, PFHxS, PFOA and PFOS (FIG. 7).

All experiments were conducted as mentioned above, in one-pass continuous mode in anode-cathode sequence, with a flow rate set at 5 mL/min that corresponds to a surface area-normalized permeate flux of 175 L/m² h (LMH). In the experiments with single compound solution of PFOS, the contaminant was added to tap water (pH 7.6-7.8, conductivity 0.4 mS/cm) at the initial concentration of 2 μM, and the anodic currents applied were 50, 100 and 150 mA. The obtained removal efficiencies of PFOS at applied currents of 50, 100 and 150 mA, were respectively 34±9%, 38±6% and 60±5% (FIG. 6). In the experiment with a mixture of six PFASs, model contaminants were added to 10 mM phosphate buffer ($Na_2HPO_4/NaH_2PO_4$, pH 7.2, 1.2 mS/cm) and the anodic currents applied were 100 and 200 mA. The obtained removal efficiencies of six PFASs were 46.8% (PFOA), 38.7% (PFOS), 26.8% (PFHxA), 37.8% (PFHxS), 5.8% (PFBA) and 8.5% (PFBS) for 100 mA, and 67.8%, 72.5%, 48.1%, 70.8%, 25.8% and 29.1% at 200 mA, respectively.

Example 6: Analytical Methods

Target organic contaminants were analyzed with a 5500 QTRAP hybrid triple quadrupole-linear ion trap mass spectrometer with a turbo Ion Spray source (Applied Biosystems), coupled to a Waters Acquity Ultra-Performance™ liquid chromatograph (Milford).

IPM and DTR were analyzed in electrospray (ESI) positive mode using an Acquity ultraperformance liquid chromatography (UPLC) HSS T3 column (2.1×50 mm, 1.8 μm, Waters) run at 30° C. The eluents employed were acetonitrile with 0.1% formic acid (eluent A) and milli-Q (LC-MS grade) water with 0.1% formic acid (eluent B) at a flow rate of 0.5 mL/min. The gradient was started at 2% of eluent A that was increased to 20% a by 3 min, further increase to 50% A by 6 min and further increased to 95% a by 7 min. It was kept constant for 2.5 min, before returning to the initial condition of 2% A by 9.5 min. The total run time was 11 min.

TCL and DCF were analyzed in the ESI negative mode using an Acquity UPLC© BEH C18 column (2.1×50 mm, 1.7 um, Waters) run at 30° C. The eluents for ESI negative mode were milli-Q (LC-MS grade) water containing a mixture of acetonitrile and methanol (1:1 v/v) (eluent A) and 1 mM ammonium acetate (eluent B) at a flow rate of 0.6 mL/min. The gradient was started at 5% A, further increased to 100% A by 7 min and then kept constant for 2 min, before returning to the initial conditions of 5% A by 9 min. The total run time in the ESI negative mode was 10 min.

The target organic contaminants were analyzed in a multiple reaction monitoring (MRM) according to the previously published methods. Free and total chlorine were measured with Chlorine/Ozone/Chlorine dioxide cuvette tests LCK 310 (Hach Lange Spain SL) immediately after sampling. Chloride and perchlorate were measured by high-pressure ion chromatography (HPIC) using a Dionex ICS-5000 HPIC system.

What is claimed is:

1. A method to prepare a graphene coated sponge-based electrode comprising:
    obtaining a graphene coated sponge by:
        filling mineral wool with a solution comprising graphene material by successive squeezing to obtain a mineral wool soaked with graphene material;
        transferring the mineral wool soaked with graphene material into a hydrothermal reactor and submitting it to heating from 60 to 240° C. for 5 minutes to 72 hours to have graphene material bonded to mineral wool;
        cleaning the heated material to remove the unbonded graphene material and reaction by-products from the graphene coated mineral wool; and
    connecting the graphene coated sponge to electrical current.

2. The method according to claim 1, wherein the graphene material is graphene oxide.

3. The method according to claim 1, wherein the heated material is cleaned in a water-based bath or in a flow-through reactor.

4. The method according to claim 1, wherein the solution comprising graphene material further includes a dopant, preferably selected from the group of boric acid, urea, metal precursors and 2D materials.

5. The method according to claim 1, wherein the metal precursors are selected from the group consisting of tin chloride (II), iron chloride (II), titanium chloride (IV) and mixtures thereof.

6. The method according to claim 4, wherein the 2D materials are selected from the group consisting of hexagonal boron nitride, phosphorene, borophene, graphydine, molybdenum disulfide, and mixtures thereof.

7. The method according to claim 1, wherein the solution comprises graphene material in a concentration between 0.001 and 10 g/L of graphene material per liquid base.

8. The method according to claim 3, wherein the heated material is cleaned in a water-based bath for a time between 1 minute and 72 hours at a temperature from 30 to 200° C.

9. The method according to claim 1, wherein metallic current feeders are configured to connect the graphene coated sponge to the electrical current.

10. The method according to claim 9, wherein the metallic current feeders are selected from the group comprising stainless steel, titanium, niobium or tantalum.

11. A graphene coated sponge-based electrode obtained by the method according to claim 1.

12. An electrochemical flow-through reactor comprising at least an anode and a cathode wherein at least one of the electrodes is the graphene coated sponge-based electrode according to claim 11.

* * * * *